United States Patent
Holland

[11] Patent Number: 5,855,391
[45] Date of Patent: Jan. 5, 1999

[54] AIR BAG COVER

[75] Inventor: Shawn Holland, Waterloo, Canada

[73] Assignee: Custom Trim Ltd., Ontario, Canada

[21] Appl. No.: 640,529

[22] Filed: May 1, 1996

[30] Foreign Application Priority Data

Jun. 9, 1995 [CA] Canada ................................. 2151404

[51] Int. Cl.$^6$ ................................................ B60R 21/16
[52] U.S. Cl. ........................................ 280/728.3; 280/731
[58] Field of Search ................................ 280/728.3, 731, 280/732

[56] References Cited

U.S. PATENT DOCUMENTS

| | | | |
|---|---|---|---|
| 3,853,334 | 12/1974 | Auman et al. | 280/728.3 |
| 4,097,064 | 6/1978 | Ikawa et al. | 280/732 |
| 4,120,516 | 10/1978 | Takamatsu et al. | 280/728.3 |
| 4,148,503 | 4/1979 | Shiratori et al. | 280/731 |
| 5,060,971 | 10/1991 | Nanbu et al. | 280/728.3 |
| 5,084,122 | 1/1992 | Fukushima et al. | 156/252 |
| 5,096,220 | 3/1992 | Nakajima | 280/728.3 |
| 5,110,647 | 5/1992 | Sawada et al. | 428/43 |
| 5,172,931 | 12/1992 | Baba et al. | 280/728.3 |
| 5,195,773 | 3/1993 | Sawada et al. | 280/728.3 |
| 5,201,541 | 4/1993 | Jones et al. | 280/731 |
| 5,215,330 | 6/1993 | Kurita | 280/728.3 |
| 5,292,150 | 3/1994 | Watanabe et al. | 280/728.3 |
| 5,306,040 | 4/1994 | Leonelli et al. | 280/728.3 |
| 5,335,935 | 8/1994 | Proos et al. | 280/728.3 |

Primary Examiner—Kenneth R. Rice
Attorney, Agent, or Firm—Zarley, McKee, Thomte, Voorhees & Sease

[57] ABSTRACT

A leather covered air bag enclosure is provided by forming a leather cover over a semi-rigid synthetic cap and providing lines of weakness in the leather cover conforming to lines of weakness in the synthetic cap. The lines of weakness may be formed of a plurality of rows of perforations so as to provide uniform performance and decorative appearance.

4 Claims, 6 Drawing Sheets

AIR BAG COVER

This invention relates to improvements in the design and manufacture of covers for automobile air bags, otherwise known as supplementary restraint systems.

In particular, this invention relates to techniques for providing an aesthetically pleasing and technically effective air bag cover made of leather.

One of the most significant developments in modern automobiles is the increasing demand for more effective safety measures to protect drivers and passengers in the event of impact or collision.

In many countries it has become mandatory to provide a restraint system in the nature of a seat belt for some or all of the occupants of a car. Although this method serves to greatly reduce the number and severity of personal injuries in automobile accidents, the effectiveness is limited, and there remains some resistance on the part of some people to wearing the seat belt.

More recently developments in auto safety have been directed towards the provision of a supplementary restraint system in the nature of an inflatable barrier, commonly known as an "air bag" which is very effective in cushioning the forward movement and impact of front seat passengers in the event of a head-on collision.

The advantage of the air bag restraint system, apart from its effectiveness in cushioning the impact, is that it is always in place, ready to operate without any requirement that the driver or user taking steps to employ it. Furthermore, modern air bags are stored within the existing equipment of a modern automobile where there are neither a visual or a physical obstacle, and therefore no reason for people to be discouraged about their use.

This advantage, however, presents the difficulty that air bags must be stored in such a way that although they are covered and not visually apparent, they must be provided with means which will allow them to be quickly and effectively deployed in an emergency. Therefore, any decorative covering which hides them must be capable of easy and automatic removal or opening. A cover which merely releases under the pressure of an air bag deployment has been found undesirable because the nearly explosive rate of inflation causes the cover to become a projectile capable of causing injury. It is therefore important that any cover on an air bag be designed so that it opens in such a way that the various parts are hinged at the sides and open like a door without breaking loose.

This has resulted in the development of plastic covers with lines of weakness created by moulding a thin portion along certain areas which will under the pressure of inflation part when the air bag is deployed.

These plastic covers are, however, not very attractive and many modern cars, especially in the luxury category, are finished with leather seats and trim.

Various attempts have been made to create more attractive covers made out of polyethylene and polyurethane which are more attractive but do not have the luxurious appearance of leather. Furthermore, these synthetic films require that they be formulated and manufactured with highly specific characteristics so that they will (a) look attractive for many years when not in use, (b) rupture with a specified pressure when the system is deployed, and (c) maintain characteristics over a range of −40° C. to +40° C. This is not easy since plastics have a tendency to change their dimensions and characteristics dramatically with changes in temperature and other atmospheric conditions.

The desirability of providing leather covers for air bag systems so as to match the rest of the interior of the automobile has been recognized but generally considered unacceptable because the variation in the grain and texture of leather leads to concern that it will perform in an unreliable or unpredictable manner. In other words it is a concern that variations in the grain and texture of leather will result in a cover which does not rupture quickly and uniformly when the air bag is deployed. In addition, the plastic housing which underlies the decorative cover has lines of weakness which tend to show through the leather and adversely affect its appearance.

It is therefore the purpose of this invention to provide a design and method of manufacture which will enable an air bag cover to be finished in leather while at the same time providing a reliable and effective release for the air bag under deployment.

These objects and advantages are sought to be achieved by the present invention in which a leather covered air bag safety device enclosure comprises a cap of semi-rigid synthetic material having lines of weakness and a leather covering installed over said cap having lines of weakness therein conforming to the lines of weakness in said cap. The lines of weakness in the leather are provided by a series of perforations. The perforations may be arranged in a plurality of rows to assure uniform performance and provide decorative appearance.

A leather covered enclosure for air bag safety devices is provided by a method which comprises cutting and splitting a piece of leather to the desired shape and thickness, forming said leather over a mould for a time and under condition sufficient to form the shape of said cover, installing said leather cover over a cap having lines of weakness formed therein, dye-stamping said leather cover to form a series of perforations to provide a decorative line of weakness conforming to lines of weakness in said cap.

The lines of weakness in the leather cover may be formed of a plurality of rows of perforations to provide uniform performance and decorative appearance.

Figure 2A:
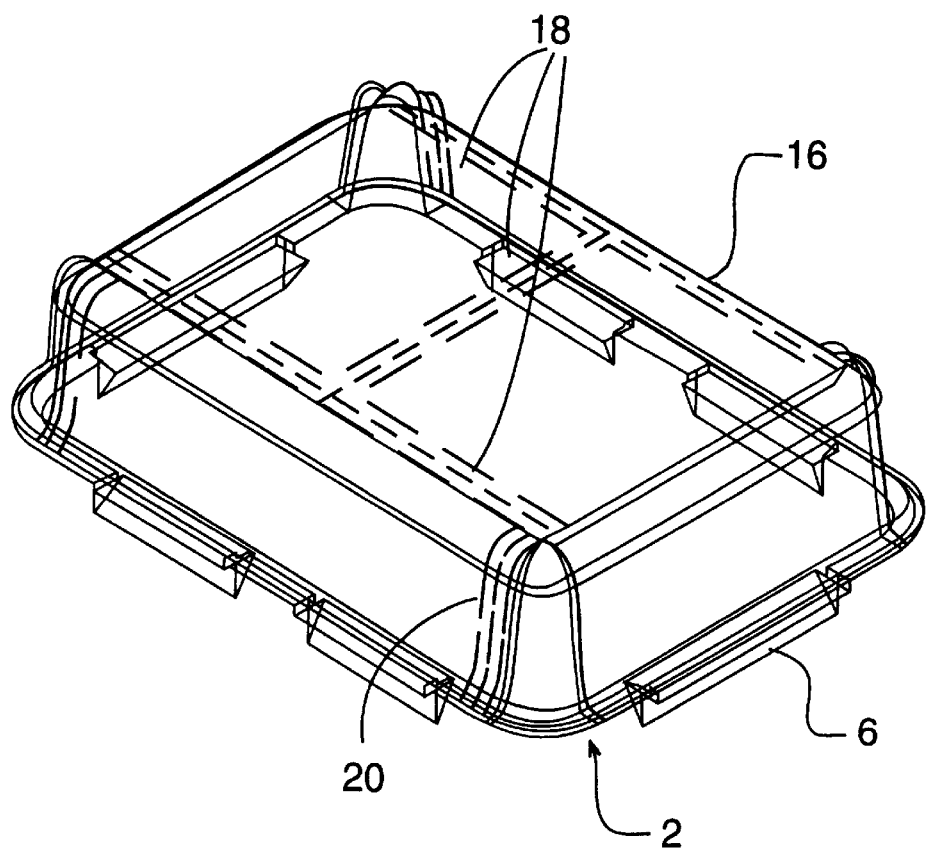
FIG. 2 is a leather cover for the lid or closure in FIG. 1.
Figure 2B:
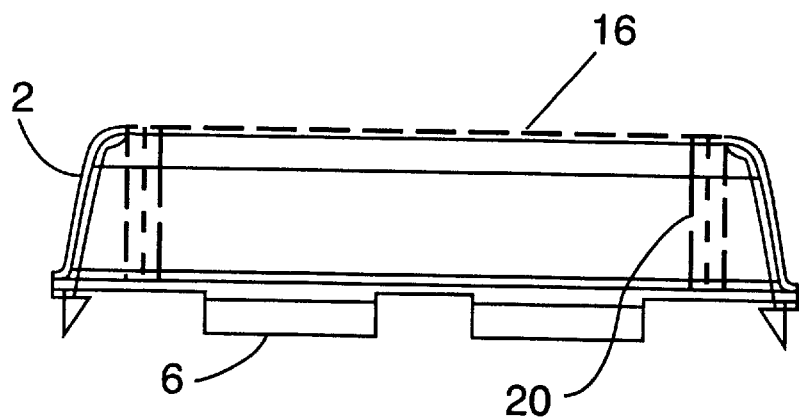
Figure 2C:
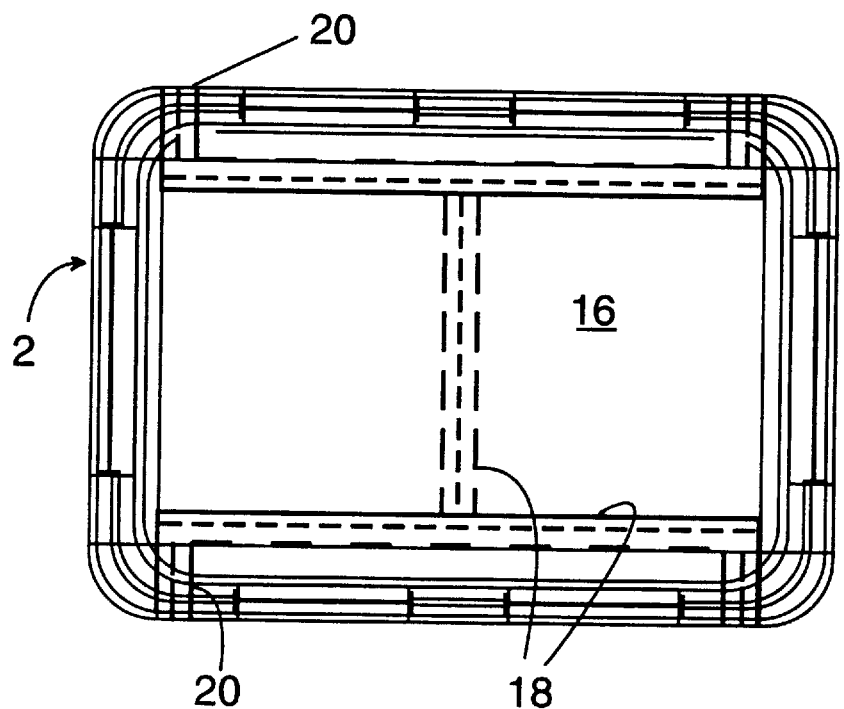
Figure 3A:
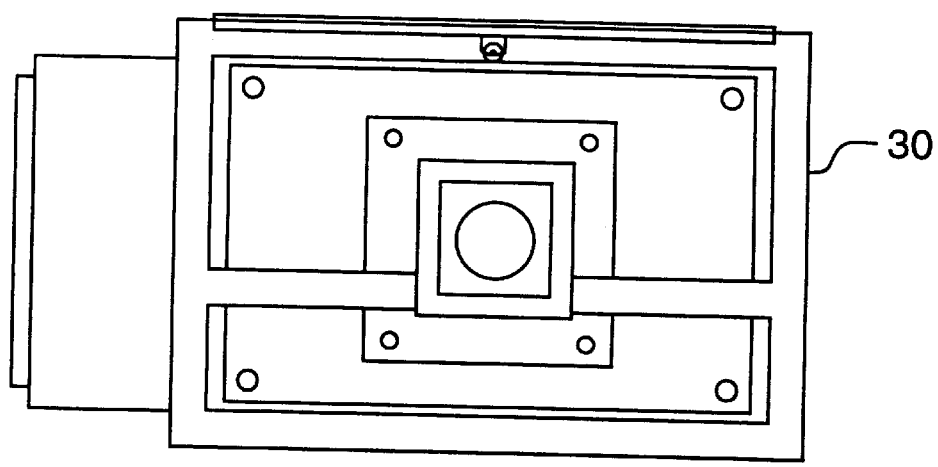
Figure 3B:
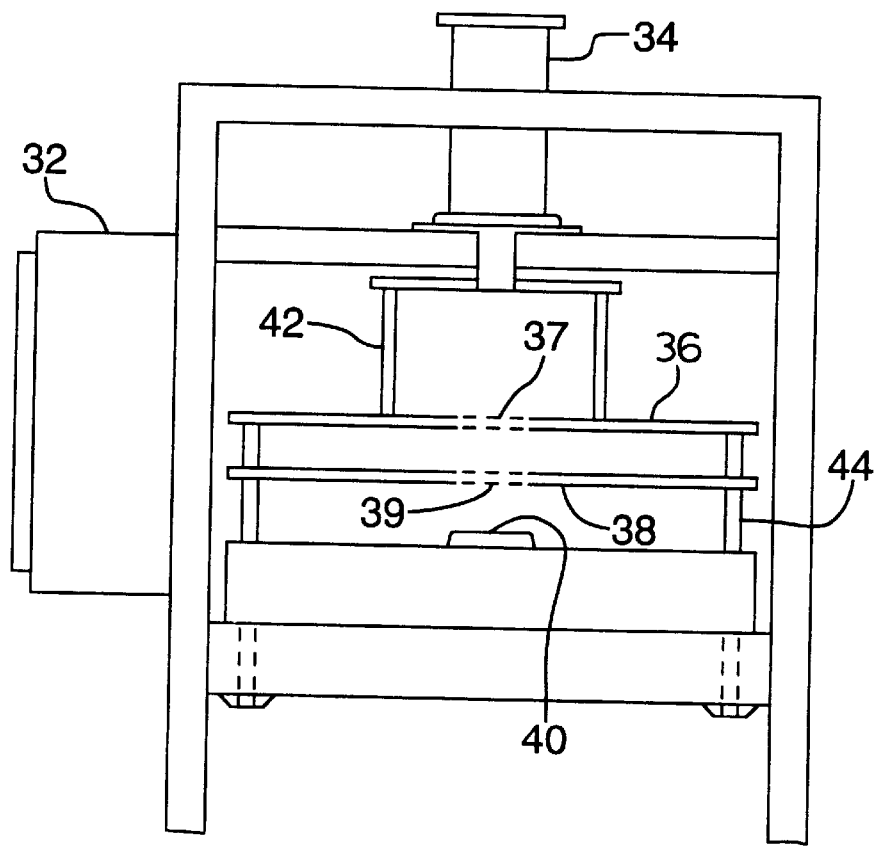
Figure 3C:
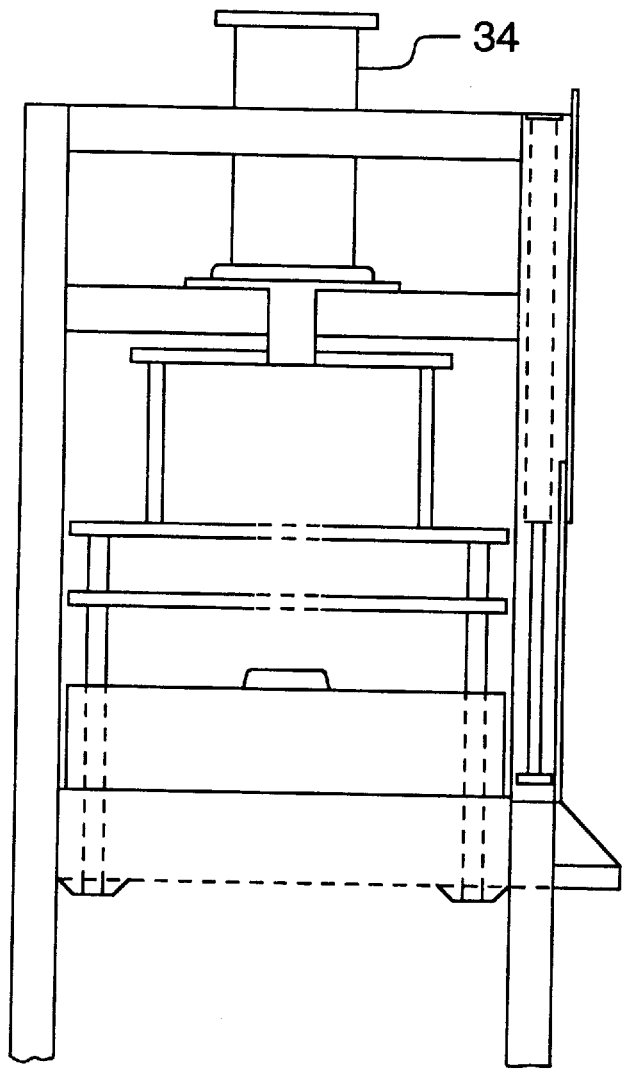
Figure 4A:
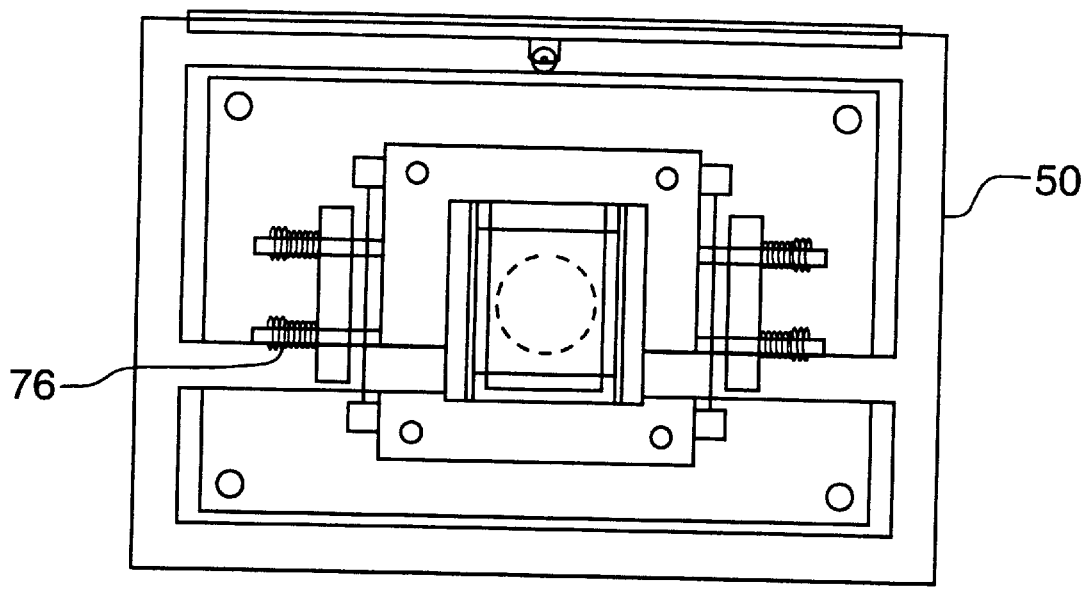
Figure 4B:
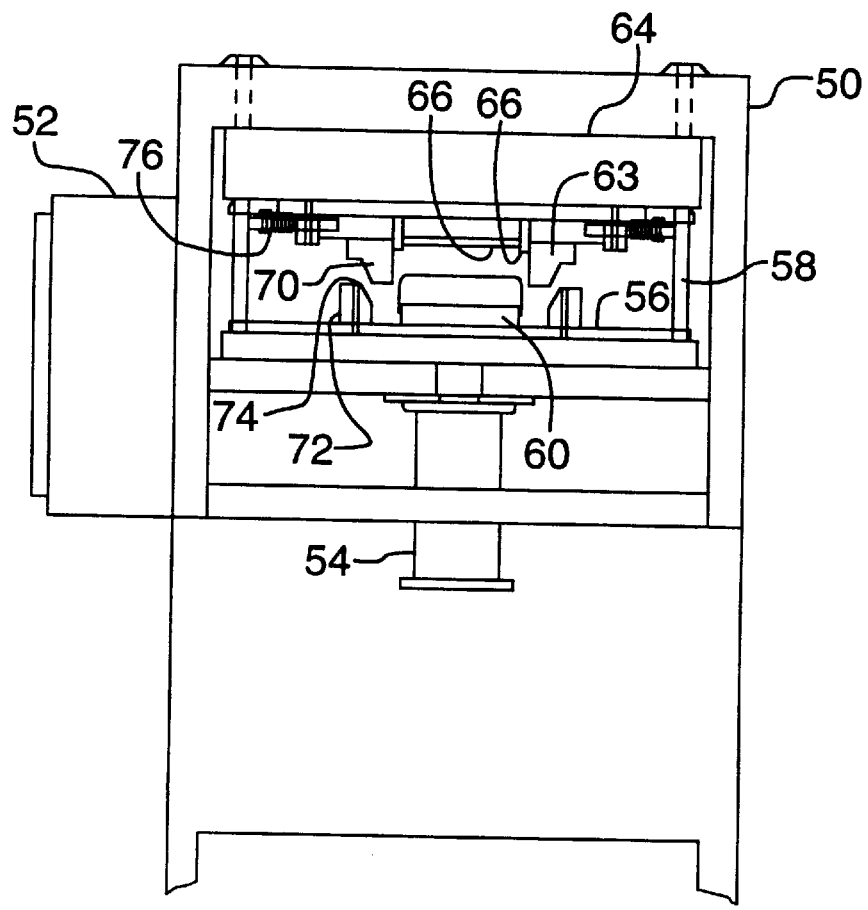
Figure 4C:
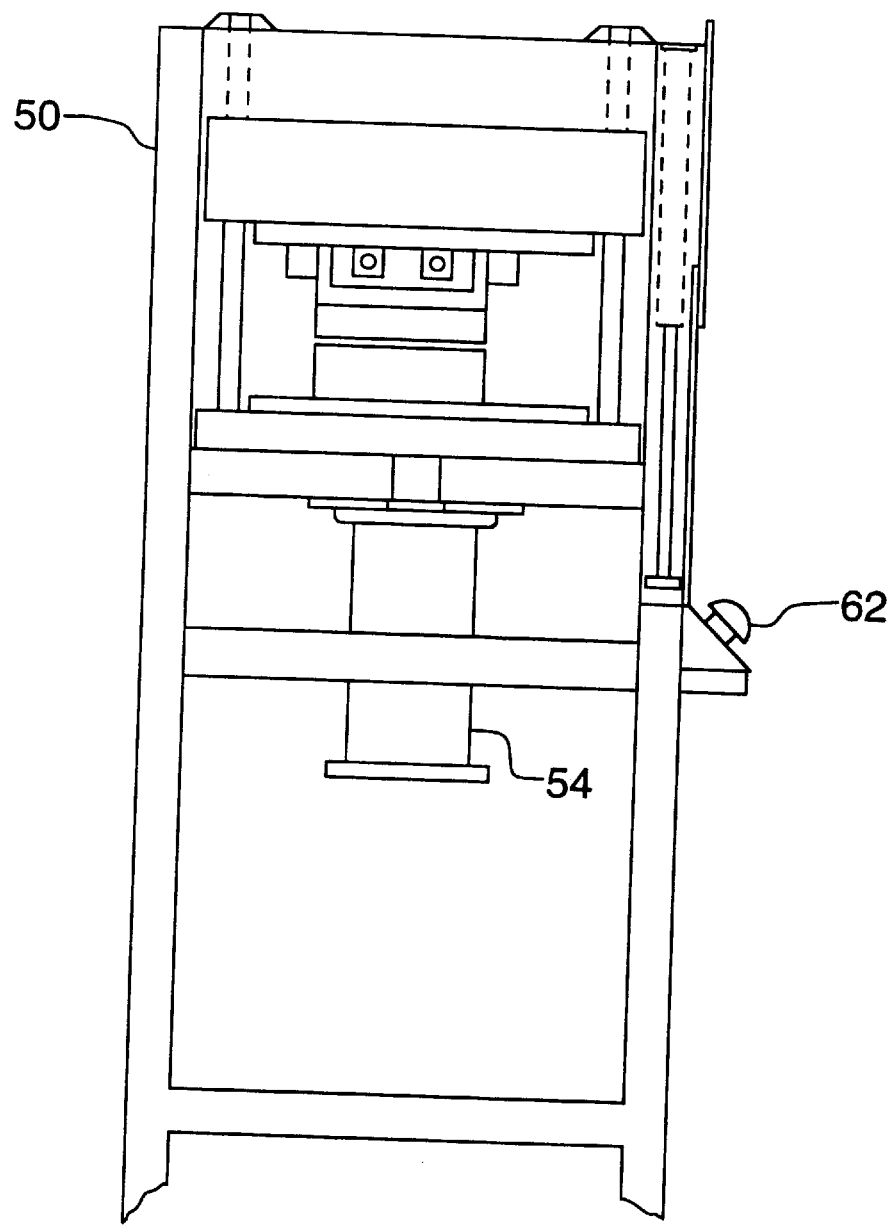

FIGS. 3a, 3b, and 3c are plan front elevation and side elevation views of apparatus for forming the cover in FIG. 2;

FIGS. 4a, 4b, and 4c are plan front elevation and side elevation views of the apparatus for creating the tear lines in the cover of FIG. 2.

Figure 1:
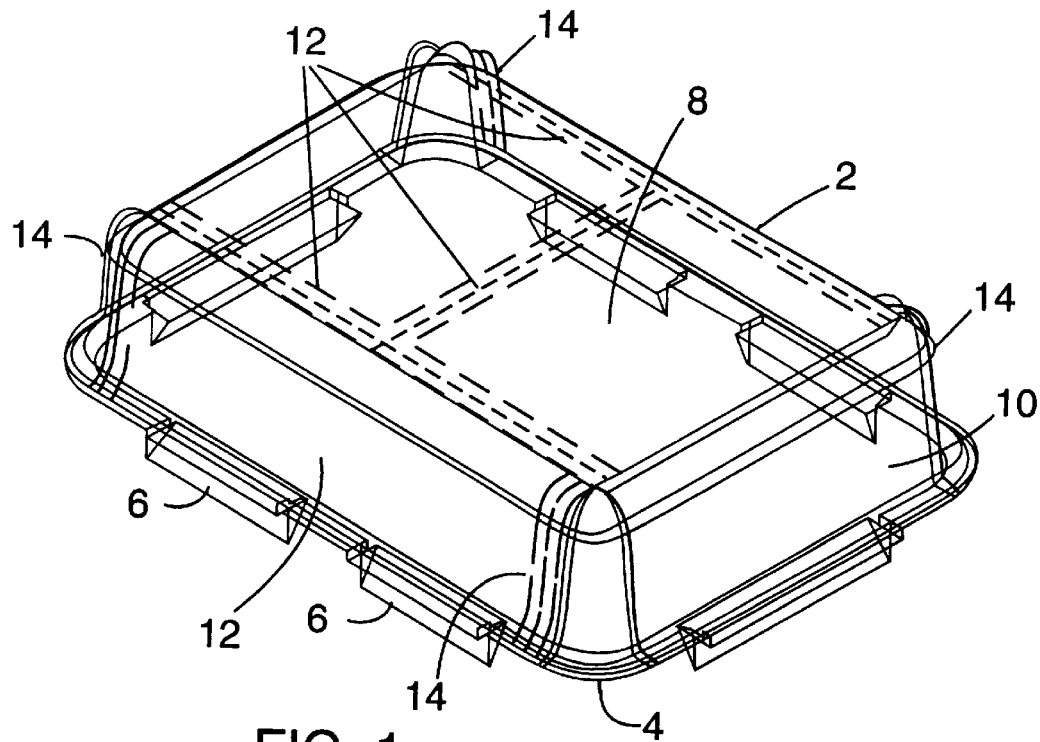
FIG. 1 is a perspective view of a semi-rigid lid or enclosure for an air bag enclosure.

FIG. 1 illustrates a typical top cap or lid for an air bag enclosure which may be mounted within the hub of a steering wheel or the dash of an automobile. It is typically made of a semi-rigid plastic material having a peripheral edge 4 adapted to fit on the body of the air bag enclosure and has a series of semi-flexible latches 6 at intervals around the periphery designed to lock onto the housing and hold the cap in a more or less permanent position once it is installed.

In the illustrated embodiment the lid has a flat top 8 and inclined surfaces 10 and 12 on the sides and ends which may be of varying depth depending on the size of the mechanism to be enclosed.

In order to allow the air bag to inflate, expand, and deploy when activated, the lid is provided with lines of weakness 12 which form an H-shaped pattern on the top surface with additional legs extending down the sides near the corners at 14.

Typically, these lines of weakness are formed by moulding the cap with a very reduced thickness along these lines so that the cap is weak in tensile and tear strength in those locations.

It would be apparent that when the air bag is inflated and creates pressure from the inside, the lines of weakness will rupture so that the top panel 8 will fold back towards the ends and the side panels 12 will fold away along the peripheral edge. Thus, the cap opens up to allow the air bag to escape and inflate. However, each of the portions of the cap are designed to remain attached on at least one side so that they do not become loose projectiles.

FIGS. 2a, 2b, and 2c are perspective elevation and plan views respectively of a lid for an air bag as shown in FIG. 1 with a covering of leather 16 formed in accordance with the present invention.

Also seen in FIG. 2a, the leather cover has a pattern of perforations 18 in the same H-shaped configuration across the middle and down each side corresponding to the pattern of weakness in the underlying plastic cap. Similarly, two legs running down each side near the corners at 20 conform to and overly the lines of weakness 14 on the cap.

Although these lines correspond and form the same pattern at the underlying lines of weakness, they are different in that they are formed of a series of intermittent perforations designed to cause a degree of weakness in the leather without interrupting the surface appearance in any substantial way.

Furthermore, instead of a single line of perforations corresponding to a single line of weakness, each of the lines of the pattern is represented by three closely spaced parallel lines forming a band of weakness instead of a single line.

This arrangement has at least two distinct advantages. First of all, considering that the strength and texture of the grain of the leather varies from location to location, three lines of perforations will more reliably ensure that the cover will predictably rupture when exposed to the force of inflating air bag.

In addition, by creating a series of lines (which may be two or four or three, as illustrated), this zone of weakness appears to the eye more attractive and more like an embossed decorative pattern rather than a rupture pattern. Thus, the cover is not only mechanically reliable but is inconspicuous and aesthetically pleasing.

FIGS. 3a, 3b, and 3c are plan view, front elevation view, and side elevation view respectively, of apparatus used in forming the leather covered cap illustrated in FIG. 2a. In these drawings the apparatus is supported by a frame 30 having a control box 32 and is powered by a hydraulic cylinder 34. The hydraulic cylinder activates a top plate 36 and a lower plate 38, both of which have openings 37 and 39 corresponding in shape, dimension and location to the mould 40 located beneath.

In operation, the leather cover for the cap, having been previously die-cut to the appropriate shape, is placed between the upper plate 36 and the lower plate 38 over the opening 39 and the hydraulic cylinder 34 is activated by manual control. The cylinder presses down on the post 42 causing the top plate 36 to descend until it bears against the lower plate and the leather preform sandwiched between them. At this point the hydraulic cylinder continues to press down both plates with the leather clamped between them downward until the leather is pressed tightly over the mould 40 which is heated (to approximately 100° C.) and conforms roughly in shape to the cap illustrated in FIG. 1.

After about thirty seconds the hydraulic cylinder is released, the plates 36 and 38 move vertically upwards in response to a spring bias and under the guidance of the guide rods 44. The moulded leather cover is then removed and adhesively attached to a plastic cap for which it is moulded to fit. At this stage the leather cover is trimmed and treated with heat or manual pressure to eliminate any wrinkles or bubbles.

After the leather cover has been affixed to the cap, it is perforated by means of the apparatus shown in FIGS. 4a, 4b, and 4c which are respectively a plan view, front elevation view, and side elevation view of the perforating apparatus.

In these drawings the apparatus is supported by a frame 50 activated or deactivated by a control box 52 and powered by a hydraulic cylinder 54 to which is mounted a movable plate 56, controlled by guide 58, and having thereon a positioning block 60 designed to receive and hold in position a cap such as illustrated in FIGS. 1 and 2.

Once a leather covered cap is placed on the block 60, the machine is activated by the manual palm buttons 62 causing the hydraulic cylinder to raise the movable plate 56 upwards towards the fixed plate 64 which has mounted thereon a series of die cutters 66 which penetrate the leather and form the pattern of perforations illustrated in the top panel of the cover shown in FIG. 2A.

At the same time, in response to the cam surfaces 68, a set of side die cutters 70 move horizontally against the side of the cover to form the perforations at 20 illustrated in FIG. 2a.

The blocks 72 which act on the camming surface 69 of the side die 70 also form a positive stop surface 74 to ensure that the dies penetrate the desired amount and no further.

The camming surface 68 operate the side dies 70 against the springs 76 which bias them in the outward direction. Therefore, when the hydraulic cylinders are released after the die cutting operation, the springs return the side cutters outwards as the movable plate moves away from the stationery plate and the operator can remove the completed covered cap for installation.

By performing the perforating operation, after the leather has been applied to the cap, the location of the perforations can be more reliably and precisely positioned in relation to the line of weakness in the plastic cap.

To summarize the method of fabrication, the operations are performed in the following sequence.

First the leather hide is positioned onto a cutting press face side up so that the operator can position the cutting die onto the hide in such a manner as to avoid unacceptable leather defects and to maximize the material utilization. The operator then activates the cutting cycle of the press to stamp out a cut piece of leather of the appropriate shape.

The die cut leather is then fed through a splitting machine set up to the desired thickness and the cut piece of leather is fed through the rollers of the machine face up and any excess thickness is trimmed off so that the leather cover is of a uniform weight or thickness.

The moulding process is effected by putting the precut split leather piece into position on the lower plate of the moulding machine and activating the hydraulic cylinder so that the upper plate clamps the leather against the lower plate and the leather is pressed down on the heated mould of the apparatus for about thirty seconds to allow it to form to the shape of the air bag cap. Once it has had time to form to the desired shape, the plates are released and the leather cover is removed.

The leather cover is then adhesively glued to the top surface of a cap following which the leather cover can be trimmed and any wrinkles, bubbles, or loose leather can be eliminated by a hot air blower and a manual tool.

Once the leather cover is affixed to the plastic cap, the composite piece is placed in the perforating machine and the hydraulic cylinder, activated by the operator, causes the perforating dies to move vertically against the top surface and horizontally against the side surfaces to form the patterns illustrated. Upon release of the hydraulic cylinder the dies are withdrawn and the part can be removed to be installed in the air bag system of an automobile in a conventional way.

Although the illustrated embodiment shows a series of elongated perforations in three rows, it is conceivable that they might comprise a series of circular holes and might be aligned in two or four or more rows instead.

It will, of course, be realized that numerous other modifications and variations may be employed without departing from the inventive concept herein.

I claim:

1. An enclosure for an air bag safety device comprising:

a cap of semi-rigid synthetic material having lines of weakness formed therein;

a leather cover of similar shape mounted on said cap;

said leather cover having lines of weakness formed by a plurality of rows of perforations overlying and conforming to the lines of weakness in said cap.

2. A method of forming a leather covered enclosure for an air bag safety device comprising:

cutting and splitting a piece of leather to desired shape and thickness;

forming said leather cover over a mould for a time and under atmospheric conditions sufficient to form the leather into the shape of said cover;

installing said leather cover on a semi-rigid cap of similar shape;

die-stamping a series of perforations in said leather to form lines of weakness.

3. A method as claimed in claim 2 in which said lines of weakness in said leather overlie and conform to lines of weakness in said cap.

4. A method as claimed in claim 3, in which each line of weakness in said leather is composed of a plurality of rows of perforations.

* * * * *